United States Patent
Grot

(10) Patent No.: US 8,330,721 B2
(45) Date of Patent: Dec. 11, 2012

(54) OPTICAL NAVIGATION DEVICE WITH PHASE GRATING FOR BEAM STEERING

(75) Inventor: Annette Grot, Cupertino, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 556 days.

(21) Appl. No.: 12/388,776

(22) Filed: Feb. 19, 2009

(65) Prior Publication Data

US 2010/0207884 A1    Aug. 19, 2010

(51) Int. Cl.
*G09G 5/08* (2006.01)
(52) U.S. Cl. .......................................... 345/166
(58) Field of Classification Search .................. None
See application file for complete search history.

(56) References Cited

U.S. PATENT DOCUMENTS

| | | | | |
|---|---|---|---|---|
| 7,715,016 | B2 * | 5/2010 | Hwang et al. | 356/498 |
| 2007/0109269 | A1 * | 5/2007 | Feldmeler | 345/166 |
| 2009/0251415 | A1 * | 10/2009 | Liu et al. | 345/166 |

* cited by examiner

*Primary Examiner* — Joseph Haley

(57) ABSTRACT

An optical navigation device with a phase grating for beam steering. The optical navigation device includes a light source, and image sensor, and a beam steering element. The light source directs a light beam toward a navigation surface. The image sensor receives light along an imaging path and generates a navigation image of the navigation surface from the light received along the imaging path. The beam steering element is disposed between the navigation surface and the image sensor. The beam steering element receives reflected light from the navigation surface along a specular reflection path. The beam steering element directs a first portion of the reflected light along the imaging path toward the image sensor. The beam steering element directs a second portion of the reflected light along a beam steering path away from the imaging path.

20 Claims, 6 Drawing Sheets

OPTICAL NAVIGATION DEVICE WITH PHASE GRATING FOR BEAM STEERING

BACKGROUND

Conventional laser mice collect light reflected at a specular reflection angle. Highly specular surfaces do not scatter very much light and can produce a bright (i.e., high intensity) image. When used on highly polished or glossy surfaces (e.g., glass), the signal intensity of the reflected laser light is greater than that of a similar signal from LED mice. However, the contrast of the image is low because of the high intensity of the reflected light signal. The relatively low contrast makes it difficult to distinguish individual features on the surface and, hence, makes it difficult to determine movements of the device based on relative movements of the features in sequential navigation images.

FIG. 1 illustrates an arrangement for a conventional laser optical navigation device 10. The conventional laser optical navigation device 10 includes a light source 12 and an image sensor 14. The light source 12 directs laser light toward a specular navigation surface 16. The incident laser light approaches the specular navigation surface 16 at an angle of incidence, θ. The laser light reflects off of the specular navigation surface 16 at an angle of reflection, θ, which is equal to the angle of incidence, θ, because of the specular nature of the specular navigation surface 16. The image sensor 14 receives the reflected light and, over time, generates a sequence of images of the specular navigation surface 16. The conventional laser optical navigation device 10 also includes an imaging lens 18 to more or less focus the reflected laser light on the image sensor 14.

Due to the specular nature of the specular navigation surface 16, substantially all of the light that is incident on the specular navigation surface 16 is reflected toward the image sensor 14. Also, the reflected light does not exhibit a significant pattern because of the uniformity (i.e., low contrast) of the specular navigation surface 16. Therefore, the high intensity of the reflected light and the low contrast of the resulting image based on the reflected light render relatively little detail for use in determining movements of the conventional laser optical navigation device 10. This lack of detail in the resulting images makes it difficult to accurately determine the movements of the conventional laser optical navigation device 10 relative to the specular navigation surface 16.

SUMMARY

Embodiments of an apparatus are described. In one embodiment, the apparatus is an optical navigation device with a phase grating for beam steering. An embodiment of the optical navigation device includes a light source, and image sensor, and a beam steering element. The light source directs a light beam toward a navigation surface. The image sensor receives light along an imaging path and generates a navigation image of the navigation surface from the light received along the imaging path. The beam steering element is disposed between the navigation surface and the image sensor. The beam steering element receives reflected light from the navigation surface along a specular reflection path. The beam steering element directs a first portion of the reflected light along the imaging path toward the image sensor. The beam steering element directs a second portion of the reflected light along a beam steering path away from the imaging path. Other embodiments of the apparatus are also described.

Embodiments of a method are also described. In one embodiment, the method is a method for making an optical navigation device. An embodiment of the method includes disposing a light source within the optical navigation device. The light source directs a coherent light beam toward a navigation surface. The method also includes disposing an image sensor along an imaging path. The image sensor receives light and generates a navigation image corresponding to the light received from the navigation surface. The method also includes disposing a beam steering element between the navigation surface and the image sensor. The beam steering element receives reflected light from the navigation surface along a specular reflection path. The beam steering element directs a first portion of the reflected light along the imaging path toward the image sensor and directs a second portion of the reflected light along a beam steering path away from the imaging path.

In another embodiment, the method is a method for tracking a relative movement between an optical navigation device and a navigation surface. An embodiment of the method includes emitting light towards the navigation surface. The method also includes directing a first portion of the light, which is reflected from the navigation surface, toward an image sensor based on a phase angle of the first portion of the reflected light. The method also includes directing a second portion of the light, which is reflected from the navigation surface, away from the image sensor based on a phase angle of the second portion of the reflected light. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

While many embodiments are described herein, at least some of the described embodiments utilize a beam steering element to filter, or redirect, at least some of the specular light reflected from a specular navigation surface. More specifically, the beam steering element is located in the path of the reflected light beam so that the intensity of the specular light received at the image sensor may be reduced. Hence, only a portion of light reflected by a surface reflection feature is passed to an image sensor to detect relative motion of the optical navigation device, while the remainder of the reflected light is redirected away from the image sensor. In some embodiments, about 90% of the reflected light is redirected by the beam steering element, although other embodiment may redirect more or less of the reflected light.

Embodiments of the navigation input device with a phase grating for beam steering may be implemented in laser mice or other optical navigation input devices. In particular, embodiments of the phase grating for beam steering may be used in compact optical navigation input devices to track movements on glass or other smooth surfaces. In some embodiments, the phase grating is formed on a surface of an optical element of the optical navigation input device. The placement of the phase grating on the optical element may facilitate a smaller package size than an embodiment incorporating a beam steering element that is separate from the optical element.

Figure 1:
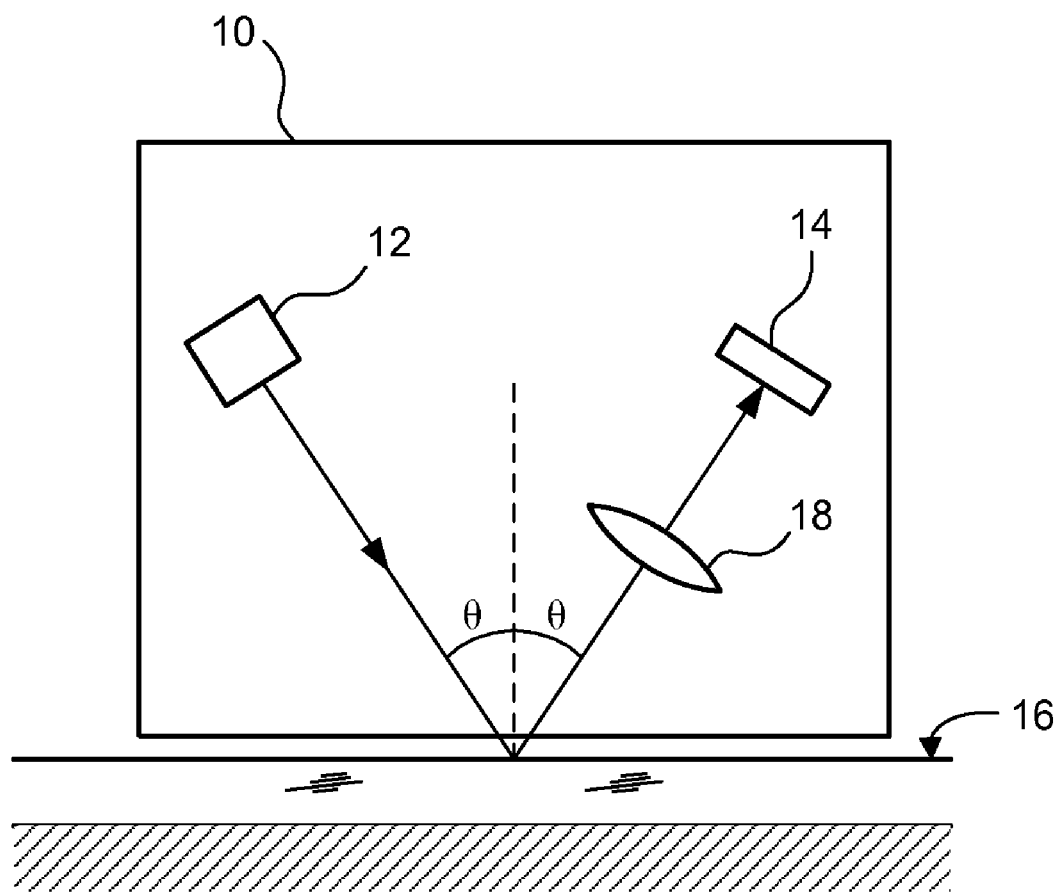
FIG. 1 depicts of an arrangement for a conventional laser optical navigation device.
Figure 2:
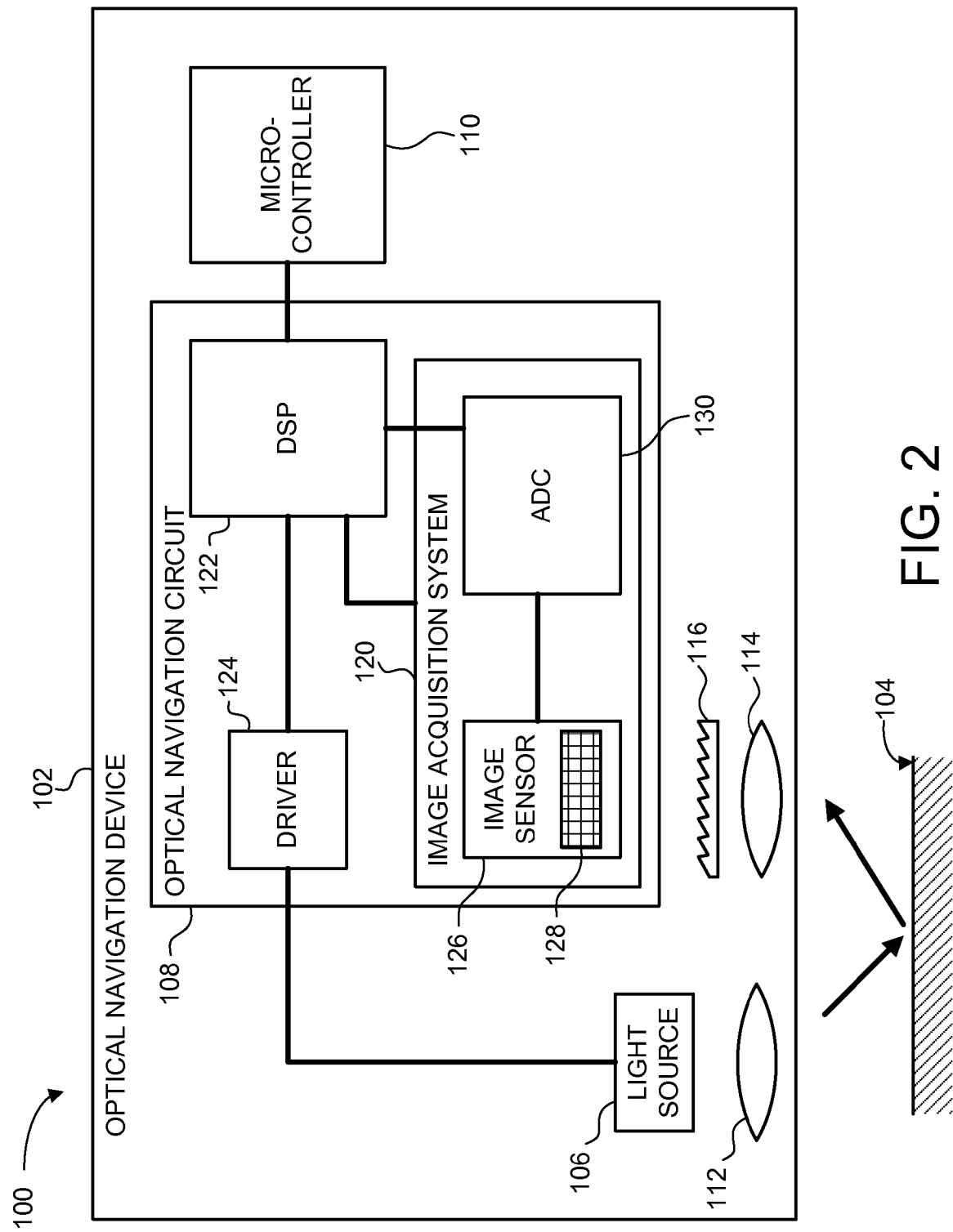
FIG. 2 depicts a schematic block diagram of one embodiment of an optical navigation system.

FIG. 2 depicts a schematic block diagram of one embodiment of an optical navigation system 100. The illustrated optical navigation system 100 includes an optical navigation device 102 relative to an illumination surface 104. In general, the optical navigation device 102 illuminates portions of the illumination surface 104 in order to generate images of the illuminated portions or features at the illumination surface 104. More specifically, the optical navigation device 102 moves relative to the illumination surface 104 and generates one or more navigation signals representative of the movement of the optical navigation device 102 relative to the illumination surface 104. Hence, the illumination surface 104 also may be referred to as a navigation surface. Additionally, since the illumination surface 104 is used to track the movement of the optical navigation device 102, the illumination surface 102 also may be referred to as a tracking surface.

In order to illuminate the illumination surface 104, the optical navigation device 102 emits a light beam which is at least partially reflected by the illumination surface 104. The optical navigation device 102 detects at least a portion of the reflected light beam and processes the detected portion to generate the navigation signals. Examples of how the navigation signals may be generated are described in more detail below.

The illumination surface 104 may be any type of surface and may include one or more types of material compositions. In the illustrated embodiment, the illumination surface 104 includes an opaque material 105a covered by a glass or other translucent material 105b. Examples of typical illumination surfaces 104 include wood, stone, or plastic laminate desktops, as well as fabric or other textured navigation pads (e.g., a mouse pad). Some types of illumination surfaces 104 are highly specular so that substantially all of the light incident on the illumination surface 104 is specularly reflected and not diffusely scattered in other directions. One example of a highly specular illumination surface 104 is a glass surface. Other embodiments may include other types of specular illumination surfaces.

The distance between the optical navigation device 102 and the illumination surface 104 may vary depending on the application for which the optical navigation device 102 is used. In surface navigation applications, the optical navigation device 102 may be relatively close to the illumination surface 104. For example, a housing of the optical navigation device 102 may be in direct, physical contact with the illumination surface 104. Alternatively, stand-off structures (not shown) attached to the housing of the optical navigation device 102 may be in direct, physical contact with the illumination surface 104. In other embodiments, the optical navigation device 102 may be within a few centimeters or inches of the illumination surface 104, without being in direct, physical contact with the illumination surface 104. In contrast, in free space navigation applications, the optical navigation device 102 may be relatively far from the illumination surface 104. For example, the optical navigation device 102 may operate outside of the surface navigation optical range.

The depicted optical navigation device 102 includes a light source 106, an optical navigation circuit 108, and a microcontroller 110. The optical navigation device 102 also includes optical elements 112 and 114, and a beam steering element 116. Other embodiments may include fewer or more components. For example, some embodiments of the optical navigation device 102 may exclude one or more of the optical elements 112 and 114.

In one embodiment, the light source 106 is a coherent light source. In one embodiment, the light source 106 is a laser. For example, the light source 106 may be a vertical cavity surface emitting laser (VCSEL). Alternatively, the light source 106 may be another type of laser or other light source. In some embodiments, the light emitted by the light source 106 is collimated.

In general, the light source 106 directs a light beam toward the illumination surface 104 to illuminate a primary illumination spot at the illumination surface 104. If the illumination surface 104 is substantially specular, then the light beam reflects off of the illumination surface 104 along a specular reflection path. The incident light beam (i.e., the light traveling toward the illumination surface 104) may pass through the optical element 112. Similarly, the reflected light beam (i.e., the light reflected from the illumination surface 104) may pass through the optical element 114. Additionally, the light from the optical element 114 may pass through the beam steering element 116. Specific functionality of the optical elements 112 and 114 and the beam steering element 116 is described in more detail below.

If there are any surface reflection features such as dust or scratches at the illumination surface 102, then some of the incident light may be reflected and scattered along one or more scattered light paths which are offset from the specular reflection path. Essentially, any path which is not the specular reflection path may be considered a scattered light path. Although there may be many types of surface reflection features which scatter the reflected light in different directions, some examples of surface reflection features include particles (e.g., dust) on the illumination surface 104, aberrations (e.g., scratches) in the illumination surface 104, as well as imperfections below or beneath the illumination surface 104. In the case of diffuse reflection off of a surface reflection feature, the reflected light may be diffused, or scattered in substantially all directions.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light beam that is emitted toward the illumination surface 104. As described above, the reflected light beam, or a portion thereof, is then received by the image acquisition system 120.

The depicted image acquisition system 120 includes an image sensor 126 and an analog-to-digital converter (ADC) 130. The image sensor 126 includes a pixel array 128 of distinct photosensors, or photodetectors. Each photosensor is referred to as a picture element (pixel). As an example, the image sensor 126 may include a 16×16 or 32×32 array of distinct photodetectors configured to detect light that is reflected from the illumination surface 104. In one embodiment, the image sensor 126 generates a plurality of electrical signals corresponding to light intensity of the reflected light at the pixel array 128. Each of the electrical signals corresponds to one of the picture elements (or pixels) of the pixel array 128. At least a portion of the light beam reflected from the illumination surface 104 is incident on the pixel array 128. In one embodiment, the optical element 114 facilitates resolution of microscopic surface images at the pixel array 128. Alternatively, the optical element 114 facilitates resolution of more distant objects in a free space navigation environment.

The analog-to-digital converter (ADC) 130 converts the plurality of electrical signals, received from the pixel array 128 of the image sensor 126, from analog signals to digital signals (e.g., 8-bit digital values). The analog-to-digital converter 130 then passes the digital signals to the digital signal processor 122.

Image information is captured by the pixel array 128 of the image sensor 126 in sensor-specific frames. A frame of image information includes a set of simultaneously captured values for each distinct photosensor in the pixel array 128. Image frames captured by the pixel array 128 include data that represents features on the illumination surface 104. The rate of image frame capture and tracking resolution can be programmable. In an embodiment, the image frame capture rate ranges up to 2,300 frames per second with a resolution of 800 counts per inch (cpi). Although some examples of frame capture rates and resolutions are provided, different frame capture rates and resolutions are contemplated.

A tracking engine (not shown) within the digital signal processor 122 compares successive image frames from the pixel array 128 to determine the movement of image features between frames. In particular, the tracking engine determines movement by correlating common features that exist in successive image frames generated by the pixel array 128. The movement between image frames is expressed in terms of movement vectors in, for example, X and Y directions (e.g., $\Delta x$ and $\Delta y$). The movement vectors are then used to determine the movement of the optical mouse relative to the navigation surface. More detailed descriptions of examples of navigation sensor movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, and U.S. Pat. No. 6,222,174, entitled METHOD OF CORRELATING IMMEDIATELY ACQUIRED AND PREVIOUSLY STORED FEATURE INFORMATION FOR MOTION SENSING, both of which are incorporated by reference herein.

After the digital signal processor 122 receives the digital form of the electrical signals from the analog-to-digital converter 130 of the image acquisition system 120, the digital signal processor 122 may perform additional processing using the digital signals. The digital signal processor 122 then transmits one or more signals to the microcontroller 110. Examples of types of signals transmitted from the digital signal processor 122 of the optical navigation circuit 108 to the microcontroller 110 include channel quadrature signals based on $\Delta x$ and $\Delta y$ relative displacement values. These signals, or other signals, may be indicative of a movement of the optical navigation device 102 relative to the illumination surface 104.

Alternatively, the quadrature or other signals may be indicative of a movement of the optical navigation device 102 relative to a distant object or surface in a free space navigation environment. Other embodiments of the digital signal processor 122 may transmit other types of signals to the microcontroller 110. In one embodiment, the microcontroller 110 implements a variety of functions, including transmitting data to and receiving data from a host computer system (not shown).

Figure 3:
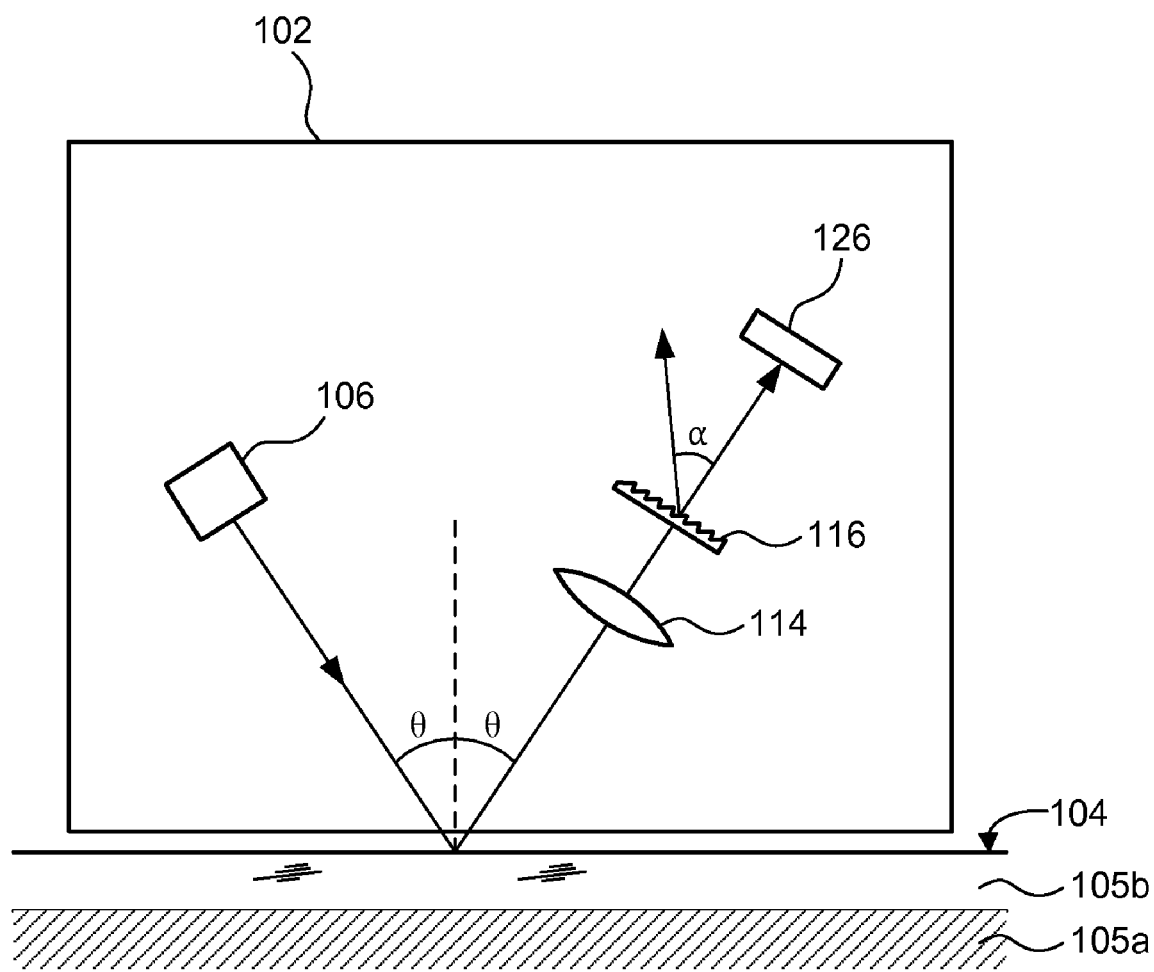
FIG. 3 depicts a schematic block diagram of another embodiment of the optical navigation device of FIG. 2 to depict the beam steering functionality of the beam steering element.

FIG. 3 depicts a schematic block diagram of another embodiment of the optical navigation device 102 of FIG. 2 that illustrates the beam steering functionality of the beam steering element 116. The depicted optical navigation device 102 includes the light source 106, the optical element 114, the beam steering element 116, and the image sensor 126.

As illustrated in FIG. 3, light from the light source 106 is reflected at the specular navigation surface 104. The light impinges on the specular navigation surface 104 at an angle of incidence, $\theta$, with respect to the surface normal of the specular navigation surface 104, and is reflected away from the specular navigation surface 104 at an angle of reflection, $\theta$, which is equal to the angle of incidence, $\theta$. If there are any surface reflection features such as dust or scratches at the specular navigation surface 104, then some of the incident light may be reflected and scattered along one or more scattered light paths which are offset from the specular reflection path, as described above. In some embodiments, the angle of reflection, $\theta$, is between about 2-60 degrees, although other embodiments may be implemented using other angles of incidence and reflection.

Figure 4:
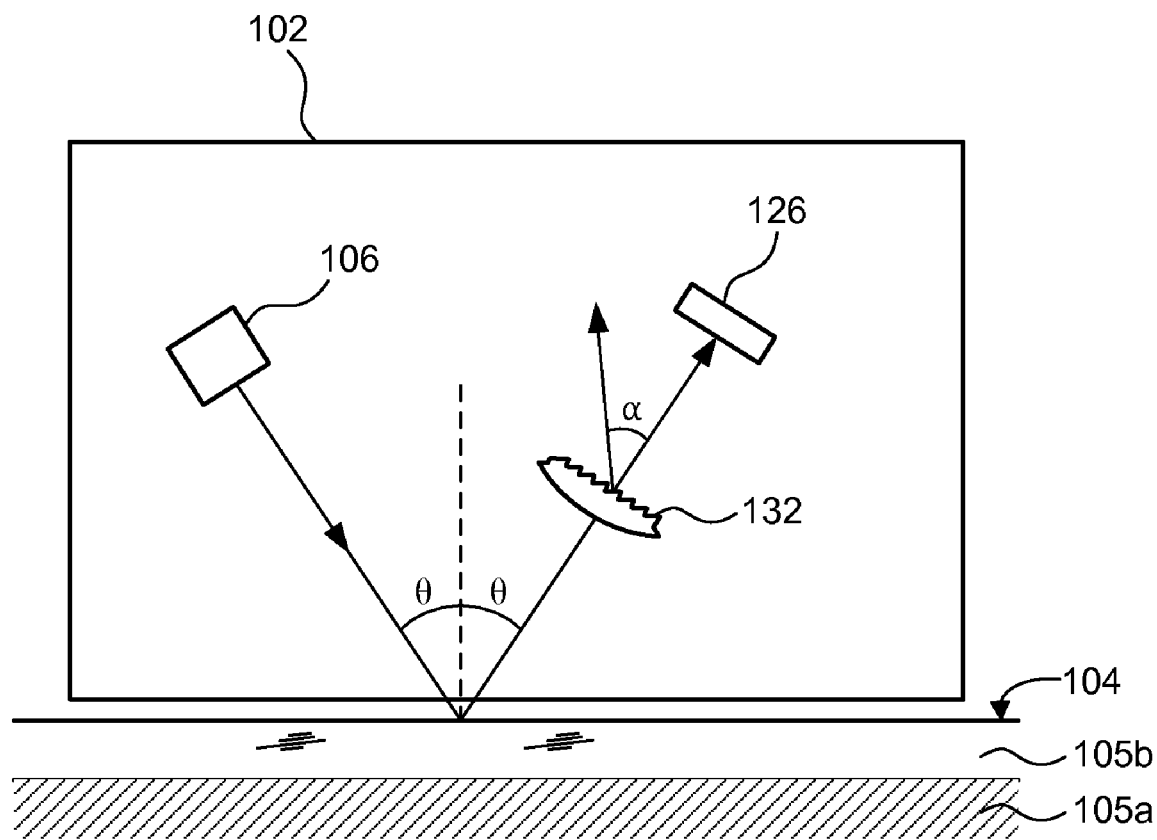
FIG. 4 depicts a schematic block diagram of another embodiment of the optical navigation device of FIG. 2.

In some embodiments, the reflected light passes through the optical element 114, which directs the reflected light to the beam steering element 116. The beam steering element 116 may be separate from the optical element 114, as shown in FIG. 3, or integrated with the optical element 114, as shown in FIG. 4 and described below.

In one embodiment, the beam steering element 116 is a transmission grating. One example of a transmission grating is a phase grating. In one embodiment, the beam steering element 116 is a blazed grating and, in another embodiment, the beam steering element 116 is a four-phase binary grating. Other embodiments may use other types of phase gratings.

In general, the beam steering element 116 reduces the intensity of the reflected light at the image sensor. More specifically, the beam steering element 116 reduces the intensity of the reflected light at the image sensor 126 by redirecting a portion of the reflected light away from the image sensor 126. The angle between imaging path (i.e., the direction of the light directed toward the image sensor 126) and the beam steering path (i.e., the direction of the light directed away from the image sensor 126) is designated as $\alpha$. The separation angle, $\alpha$, between the imaging path and the beam steering path can be relatively small. In some embodiments, the imaging path is separated from the beam steering path by about 2-10 degrees, although other embodiments may use a different separation angle, $\alpha$.

In general, the beam steering element 116 redirects a portion of the light away from the imaging path by separating light having different phases according to different diffraction angles. Additionally, the light which reflects off of the substantially specular surface maintains a relatively constant phase angle, except for the light which reflects off of a surface reflection feature that changes the phase angle. Thus, the light reflecting off a surface reflection feature may reflect at one or more different phase angles. Consequently, the beam steering element 116 can separately direct the different phase angles along different paths. By separating the beam steering element 116 from the image sensor 126 by a sufficient distance, the various diffraction orders have a distance along which the diffraction orders can separate from one another. In particular, the beam steering element 116 can direct light with one or more of the phase angles toward the image sensor 126, while directing any remaining light with a different phase angle away from the image sensor 126. More specifically, the beam steering element 116 makes a "copy" of the specular reflection, but at a slightly different angle. When this angle is small, the image sensor 126 will receive some amount of specular light which interferes with weaker, off-axis scattered light. The interference pattern of the specular and scattered light is sufficient for the phase to be measured as an intensity pattern which is proportional to the intensity of the specular beam.

The light which passes through the beam steering element 116 is diffracted along different diffraction angles, including a zero order diffraction angle, a first positive diffraction angle, a first negative diffraction angle, and so forth. In one embodiment, the light directed along the zero order diffraction angle is directed toward the image sensor 126, while the light directed along the non-zero diffraction angles is directed away from the image sensor 126. Alternatively, light directed along a non-zero diffraction angle may be directed toward the image sensor 126, and the light directed along the zero order diffraction angle and the remaining non-zero diffraction angles may be directed away from the image sensor 126. It should be noted that references to the zero order and non-zero diffraction angles are merely general references and may generally refer to a range of diffraction orders, or angles, at or near the specific diffraction orders, or angles. Other embodiments may direct the light along the corresponding diffraction orders, or angles, differently.

As one example, the beam steering element 116 may redirect about 90% of the reflected light away from the image sensor 126, so that about 10% of the reflected light is directed toward the image sensor 126. As another example, the beam steering element 116 may redirect at least about 70% of the reflected light away from the image sensor 126. In another example, the beam steering element 116 may redirect between about 85-95% of the reflected light away from the image sensor 126.

FIG. 4 depicts a schematic block diagram of another embodiment of the optical navigation device 102 of FIG. 2 in which the beam steering element 116 is formed on a surface of the optical element 114. In this way, the beam steering element 116 and the optical element 114 form a unified optical structure 132. The unified optical element 132 may be oriented with the beam steering element 116 on the surface near the image sensor 126 or, alternatively, on the surface near the navigation surface 104. Combining the beam steering element 116 with the optical element 114 in the unified optical structure 132 enables a smaller package size than optical navigation devices in which the beam steering element 116 and the optical element 114 are separate structures (refer to FIG. 3).

Figure 5:
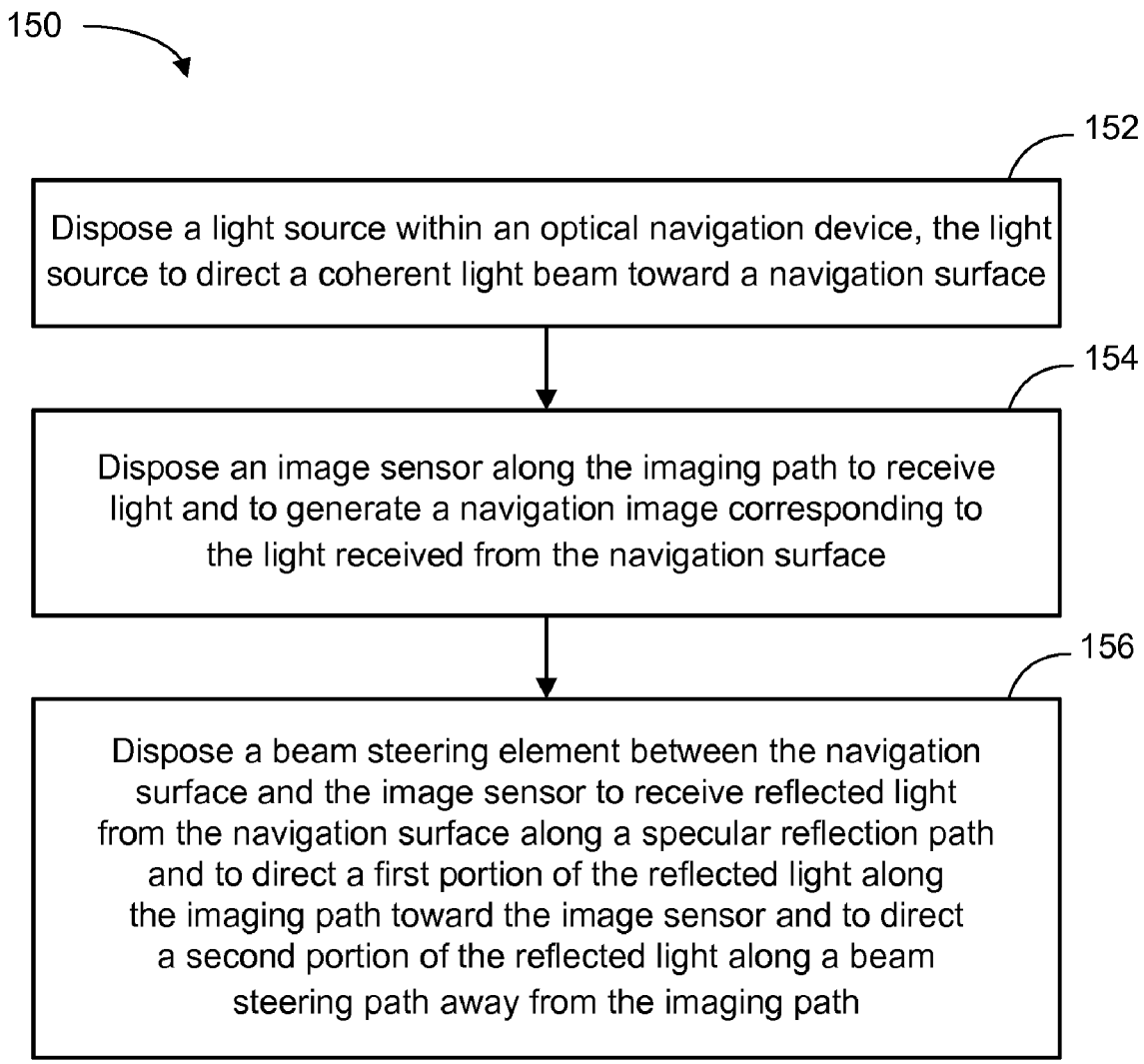
FIG. 5 depicts a schematic flow chart diagram of one embodiment of a method for making an optical navigation device with a beam steering element.

FIG. 5 depicts a schematic flow chart diagram of one embodiment of a method 150 for making an optical navigation device 102 with a beam steering element 116. Although the method 150 is described in conjunction with the optical navigation device 102 of FIG. 2, embodiments of the method 150 may be implemented to make other types of optical navigation devices.

In the illustrated method 150, at block 152 the light source 106 is disposed within the optical navigation device 102 in order to direct a coherent light beam toward the navigation surface 104. At block 154, the image sensor 126 is disposed along an imaging path to receive light and to generate a navigation image corresponding to the light received from the navigation surface 104. At block 156, the beam steering element 116 is disposed between the navigation surface 104 (or the portion of the device housing which corresponds to the navigation surface 104) and the image sensor 126. The beam steering element 116 receives the reflected light from the navigation surface 104 along a specular reflection path. The beam steering element directs a first portion of the reflected light along the imaging path toward the image sensor 126 and directs a second portion of the reflected light along a beam steering path away from the imaging path. Thus, the beam steering element 116 redirects the second portion of the reflected light away from the image sensor 126. The depicted method 150 then ends.

Figure 6:
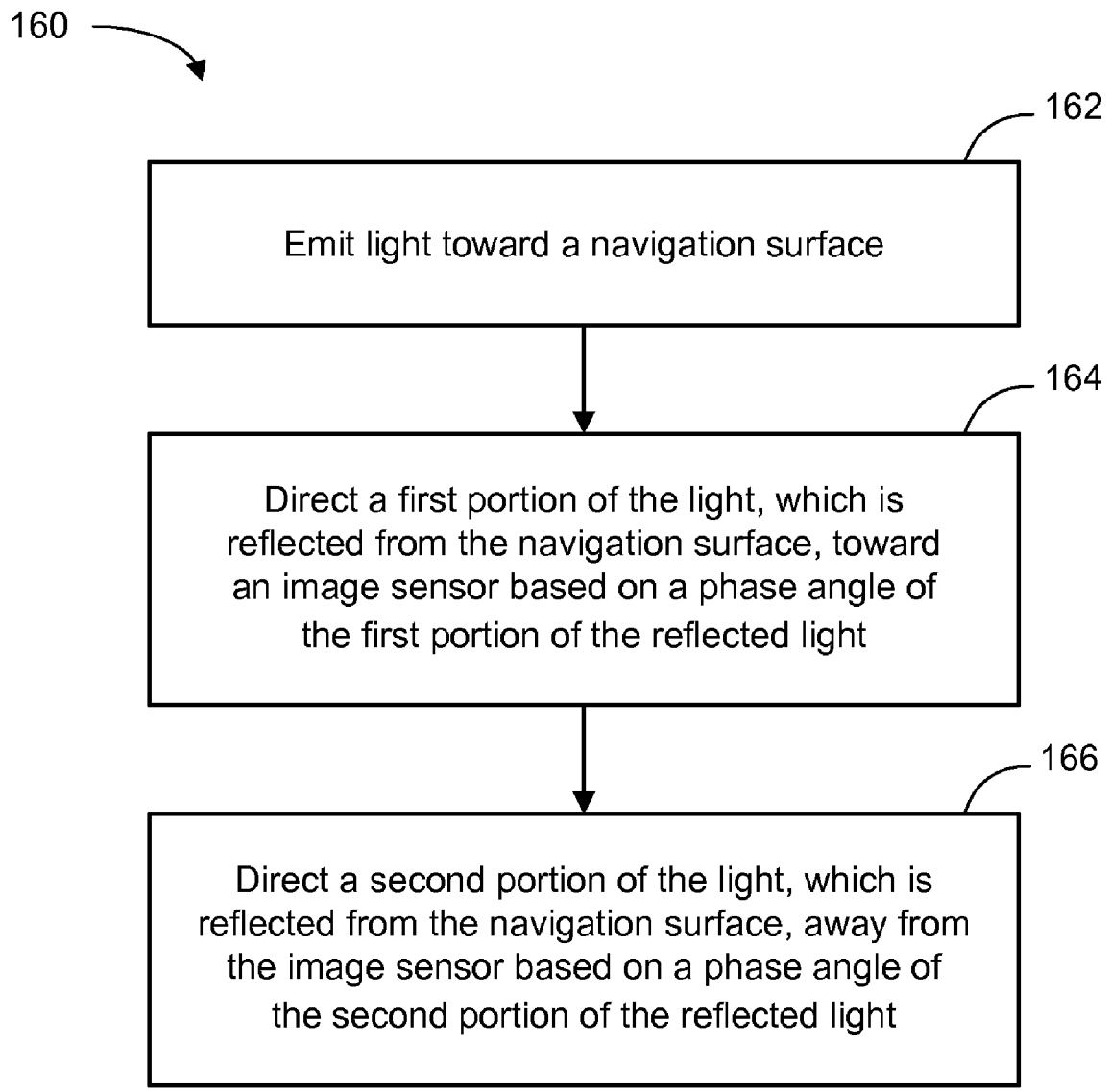
FIG. 6 depicts a schematic flow chart diagram of one embodiment of a method for tracking a relative movement between an optical navigation device and a navigation surface.

FIG. 6 depicts a schematic flow chart diagram of one embodiment of a method 160 for tracking a relative movement between an optical navigation device 102 and a navigation surface 104. Although the method 160 is described in conjunction with the optical navigation device 102 of FIG. 2, embodiments of the method 160 may be implemented with other types of optical navigation devices.

In the illustrated method 160, at block 162 the light source 106 emits light toward the navigation surface 104. The navigation surface 104 reflects the light toward the beam steering element 116. At block 164, the beam steering element 116 directs a first portion of the reflected light toward the image sensor 126 based on a phase angle of the first portion of the reflected light. In contrast, at block 166 the beam steering element 116 directs a second portion of the reflected light away from the image sensor 126 based on the phase angle of the second portion of the reflected light. In this way, the beam steering element 116 is capable of reducing the resulting intensity of the light at the image sensor 126. By reducing the intensity of the light at the image sensor 126 in this manner, the beam steering element 116 is able to enhance the image contrast of features within the navigation image generated by the image sensor 126. Hence, the optical navigation device 102 is able to more easily distinguish features within each navigation image and more accurately determine movement correlations among various navigation images. The depicted method 160 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical navigation device comprising:
   a light source to direct a coherent light beam toward a navigation surface;
   an image sensor disposed to receive light along an imaging path and to generate a navigation image of the navigation surface from the light received along the imaging path; and
   a transmissive beam steering element disposed between the navigation surface and the image sensor, the beam steering element to receive reflected light from the navigation surface along a specular reflection path aligned with the imaging path between the navigation surface and the beam steering element, wherein the beam steering element is configured to direct a first portion of the reflected light along the imaging path toward the image sensor and to diffract a second portion of the reflected light along a beam steering path away from the imaging path.

2. The optical navigation device of claim 1, wherein the image sensor comprises a plurality of photodetector elements, wherein the image sensor is further configured to detect the first portion of the reflected light at the photodetector elements of the image sensor and to generate the navigation image based on the first portion of the reflected light.

3. The optical navigation device of claim 1, wherein the beam steering element comprises a transmission grating to transmit the second portion of the reflected light along the beam steering path away from the image sensor, wherein the beam steering path is aligned with a non-zero diffraction angle.

4. The optical navigation device of claim 3, wherein the transmission grating comprises a blazed phase grating.

5. The optical navigation device of claim 3, wherein the transmission grating comprises a four-phase grating.

6. The optical navigation device of claim 3, further comprising an imaging lens disposed between the navigation surface and the image sensor, wherein the transmission grating is disposed on a surface of the imaging lens.

7. The optical navigation device of claim 3, wherein the transmission grating is disposed separately from an imaging lens, wherein the transmission grating is separated from the imaging lens by a separation distance.

8. The optical navigation device of claim 1, wherein the imaging path and the beam steering path are separated by a separation angle, wherein the separation angle is greater than approximately 8 degrees.

9. The optical navigation device of claim 8, wherein the separation angle is between about 12-15 degrees.

10. The optical navigation device of claim 1, wherein the beam steering element directs at least approximately 70% of the reflected light along the beam steering path away from the imaging path.

11. The optical navigation device of claim 1, wherein the beam steering element directs between about 85-95% of the reflected light along the beam steering path away from the imaging path.

12. The optical navigation device of claim 1, wherein the beam steering element is further configured to direct the first and second portions of the reflected light along the imaging and beam steering paths based on corresponding phase angles of the first and second portions of the reflected light.

13. A method for making an optical navigation device, the method comprising:
   disposing a light source within the optical navigation device, the light source to direct a coherent light beam toward a navigation surface;
   disposing an image sensor along an imaging path to receive light and to generate a navigation image corresponding to the light received from the navigation surface; and
   disposing a transmissive beam steering element between the navigation surface and the image sensor, the beam steering element to receive reflected light from the navigation surface along a specular reflection path aligned with the imaging path between the navigation surface and the beam steering element, wherein the beam steering element is configured to direct a first portion of the reflected light along the imaging path toward the image sensor and to diffract a second portion of the reflected light along a beam steering path away from the imaging path.

14. The method of claim 13, wherein the transmission grating comprises a blazed phase grating or a four-phase grating.

15. The method of claim 13, further comprising disposing an imaging lens between the navigation surface and the image sensor, wherein the transmission grating is disposed on a surface of the imaging lens, or the transmission grating is disposed separately from the imaging lens.

16. A method for tracking a relative movement between an optical navigation device and a navigation surface, the method comprising:
   emitting light towards the navigation surface;
   directing a first portion of the light, which is reflected from the navigation surface along a specular reflection path aligned with an imaging path, toward an image sensor based on a phase angle of the first portion of the reflected light, wherein the image sensor is disposed along the imaging path; and
   diffracting a second portion of the light, which is reflected from the navigation surface along the specular reflection path, away from the image sensor based on a phase angle of the second portion of the reflected light.

17. The method of claim 16, wherein directing the second portion of the reflected light away from the image sensor reduces an intensity of the light at the image sensor and enhances image contrast of features within a navigation image generated based on the light received at the image sensor.

18. The method of claim 16, further comprising directing the first portion of the reflected light towards the image sensor and the second portion of the reflected light away from the image sensor via a phase-sensitive optical element.

19. The method of claim 18, wherein an intensity of the first portion of the reflected light is lower than an intensity of the second portion of the reflected light.

20. The method of claim 19, wherein the first portion comprises about 10% of the reflected light, and the second portion comprises about 90% of the reflected light.

* * * * *